United States Patent [19]

Vali

[11] 4,160,158
[45] Jul. 3, 1979

[54] OPTICAL TRACER BACK-UP CIRCUIT

[75] Inventor: Enn Vali, Burlington, Canada

[73] Assignee: Westinghouse Canada Limited, Hamilton, Canada

[21] Appl. No.: 869,819

[22] Filed: Jan. 16, 1978

[30] Foreign Application Priority Data

May 16, 1977 [CA] Canada .................................. 278522

[51] Int. Cl.² .............................................. G05B 1/00
[52] U.S. Cl. ..................................... 250/202; 318/577
[58] Field of Search ................. 318/577; 250/202, 203, 250/214 R

[56] References Cited

U.S. PATENT DOCUMENTS 3,920,316  11/1975  Daguillon ........................... 250/202
4,059,788  11/1977  Vasiliev et al. ...................... 318/577

Primary Examiner—David C. Nelms
Attorney, Agent, or Firm—Robert H. Fox; Edward H. Oldham

[57] ABSTRACT

A circular scanning optical pattern tracer produces two impulses per cycle, one impulse in the forward direction and one in the reverse. Means are provided to utilize either one of said impulses selectively to cause the tracer to proceed in a given direction or reverse at will in accordance with the pulse selected.

4 Claims, 3 Drawing Figures

OPTICAL TRACER BACK-UP CIRCUIT

This invention relates to optical pattern tracing controls and in particular, to controls of the type which repetitively scan the pattern to be followed in a circular manner, derive a signal from such scanning operation and utilize the signal to control coordinate drive motors.

There are various types of optical pattern tracing machine control systems including scanning and non-scanning tracing heads, friction and coordinate drive machines, edge and line tracers. This invention has particular application to a pattern tracer of the circular scanning type for operation with a coordinate drive system which may be used for either line or edge tracing.

By a circular scanning tracer is meant a tracer which views the pattern in such a manner that the point observed by the tracing head is caused to rotate repetitively so as to describe a circular path on the surface bearing the pattern when the head is stationary. Naturally, when the head is in translational motion, the point scanned by the tracing head will more closely approach in epicycle.

The detector in the tracing head is arranged to produce a signal indicative of a change in illumination of the detector. In this way, the device may operate either as a line tracer, i.e., a tracer of a narrow mark on a surface area, or as an edge tracer, i.e., a tracer of the transition from a reflective to a less reflective area as in the case when the pattern is a silhouette. The signal representing this transition is then processed and used to control a pair of motors which when associated with suitable machinery, will cause the tracing head and related machine tool to move in a plane in accordance with the pattern, as controlled by the motors.

It will be appreciated that in accordance with general practice in this field, the convolutions performed by the tracing head will be similarly performed by the machine tool which may, for example, be a cutting torch and in this way the material to be cut will be shaped into the same form as the pattern being traced by the tracing head.

In order to provide the desired control a signal is derived from the tracing head and applied to an electronic circuit which accurately selects the transition from one condition of reflectivity to another condition of reflectivity of the pattern, converts the signal to a suitable form for further processing, and in cooperation with certain other signals from the tracing head which are phase-related to the rotational position of the scan, produces a pair of coordinate signals, i.e. an X signal and a Y signal, which are then used to control coordinate drive motors.

It will be understood that in scanning any pattern, whether it be a line or silhouette, the transition from one condition of reflectivity to another condition of reflectivity occurs both in advance of the center of scan/behind the center of scan, since the circular scan crosses the pattern twice in each revolution. In order to steer the machine, it is necessary that the transition in advance of the center of scan be used to control the coordinate drive motors. Under some circumstances, for example, in the event of a torch going out, it may be necessary to reverse the machine and cause it to retrace its path to pick up the last cut point. In any event, it is advantageous to be able to rapidly and consistently cause the machine to reverse. It is therefore necessary to select the signal opposite to the one normally selected, so that the machine now traces in the reverse direction. Systems for selecting the desired pulse are described in previous applications, in particular, reference is had to Canadian Pat. No. 1,005,549 issued Feb. 15, 1977 in the names of Francis P. Murphy, et al; which describes a method of selecting the desired pulse. Under normal operations the system is made responsive to pulses only occurring during a particular time period so that only the desired pulse is selected. When it is desired to reverse the system, it is necessary that this time period be realigned so that the reverse pulse is selected.

A clearer understanding of this invention may be had from a consideration of the following specification and drawings in which.

Figure 1:
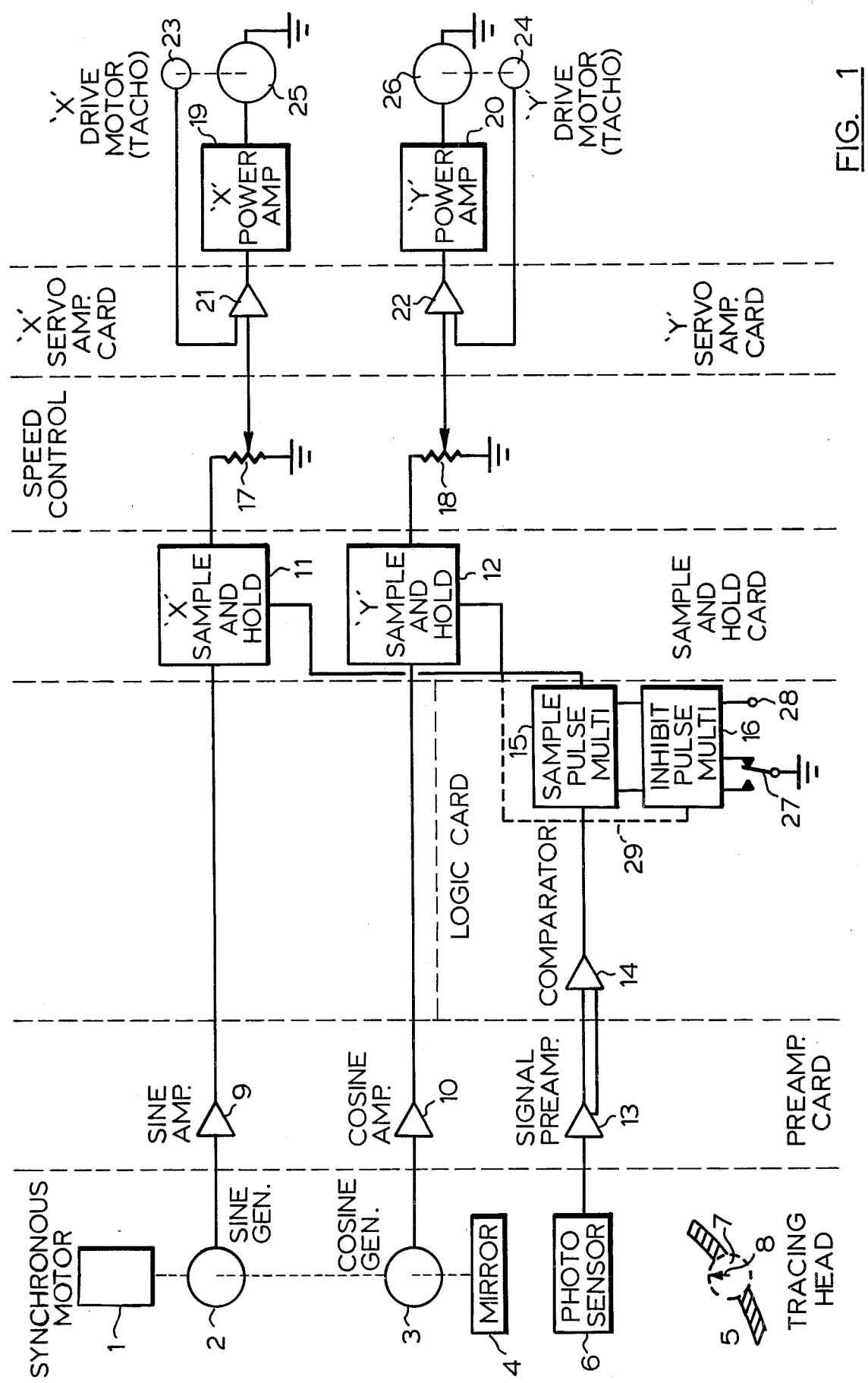
FIG. 1 is a schematic diagram of the general system of a pattern tracing machine including the invention.

Considering first FIG. 1, it will be seen the tracing head includes a synchronous motor 1 which drives a pair of generators 2 and 3 which produce sine and cosine functions representative of the rotational position of the motor. On the same shaft is mounted a mirror 4 which is at a slight angle to the shaft which, when rotated, causes an image of the pattern 5 to be reflected onto and rotated over the photosensor 6. Each transition of the pattern 5 from a reflecting to a non-reflecting condition causes a change of illumination of photosensor 6. This rotation in effect causes the photosensor 6 to observe a circular pattern 7 on the surface scanned and it will be seen this circle 7 intersects the pattern at two locations. If it is assumed that the tracer is moving in the direction indicated by the arrow 8, then the pulse produced by intersection of the circle and the pattern adjacent the end of the arrow will be the desired pulse for controlling the motors. The output from the sine generator 2 and cosine generator 3 is connected in each case to an amplifier 9 and 10 and in turn applied to sample and hold circuits 11 and 12.

The signal from the photosensor 6 is applied to a preamplifier 13, a comparator 14 and a sample pulse multivibrator 15. Also connected to the sample pulse multivibrator 15 is an inhibit pulse multivibrator 16. The output from the sample pulse multivibrator is also applied to the sample and hold circuits 11 and 12. The outputs from the sample and hold circuits are applied through potentiometers 17 and 18 to servo amplifiers 19 and 20 including tachometer feedback loops including amplifiers 21 and 22 and tachometers 23 and 24. The output from the power amplifiers 19 and 20 is applied to the drive motors 25 and 26.

OPERATION OF THE SYSTEM

The system operates in a manner described in the previous applications. In general, it will be assumed that the synchronous motor 1 causes the mirror 4 to rotate as previously described producing a pulse output which is applied to the amplifier 13. This output pulse is shaped by the comparator and applied to the multivibrator. The inhibit pulse multivibrator permits the generation of a sample pulse from the sample pulse multivibrator only during a certain period of time. In general, the inhibit pulse multivibrator is triggered by the sample pulse multivibrator and produces a pulse which thereafter prevents operation of the sample pulse multivibrator for a period of approximately 0.8 of one rotation of the motor 1. This means that only the pulse representing the forward direction of the tracer can produce a sample pulse output from the sample pulse multivibrator, since the reverse pulse is prevented from operating the sample pulse multivibrator by the inhibit pulse from inhibit pulse multivibrator 16. The resulting pulse from the sample pulse multivibrator is applied to the X and Y sample and hold circuits causing a sample of the sine wave and cosine wave to be produced and held. The resulting value held by the sample and hold circuits represents the coordinate velocities required to operate the X and Y drive motors to cause the tracer to follow the pattern. These values from the potentiometers 17 and 18 are applied to the amplifiers and cause the motors to rotate at a speed representative of these coordinate values. It will be noted that the potentiometers 17 and 18 are ganged, thus enabling the machine speed to be determined by the setting of the ganged potentiometers. Switch 27 on inhibit pulse multivibrator 16 is arranged to reverse operation.

Figure 2:
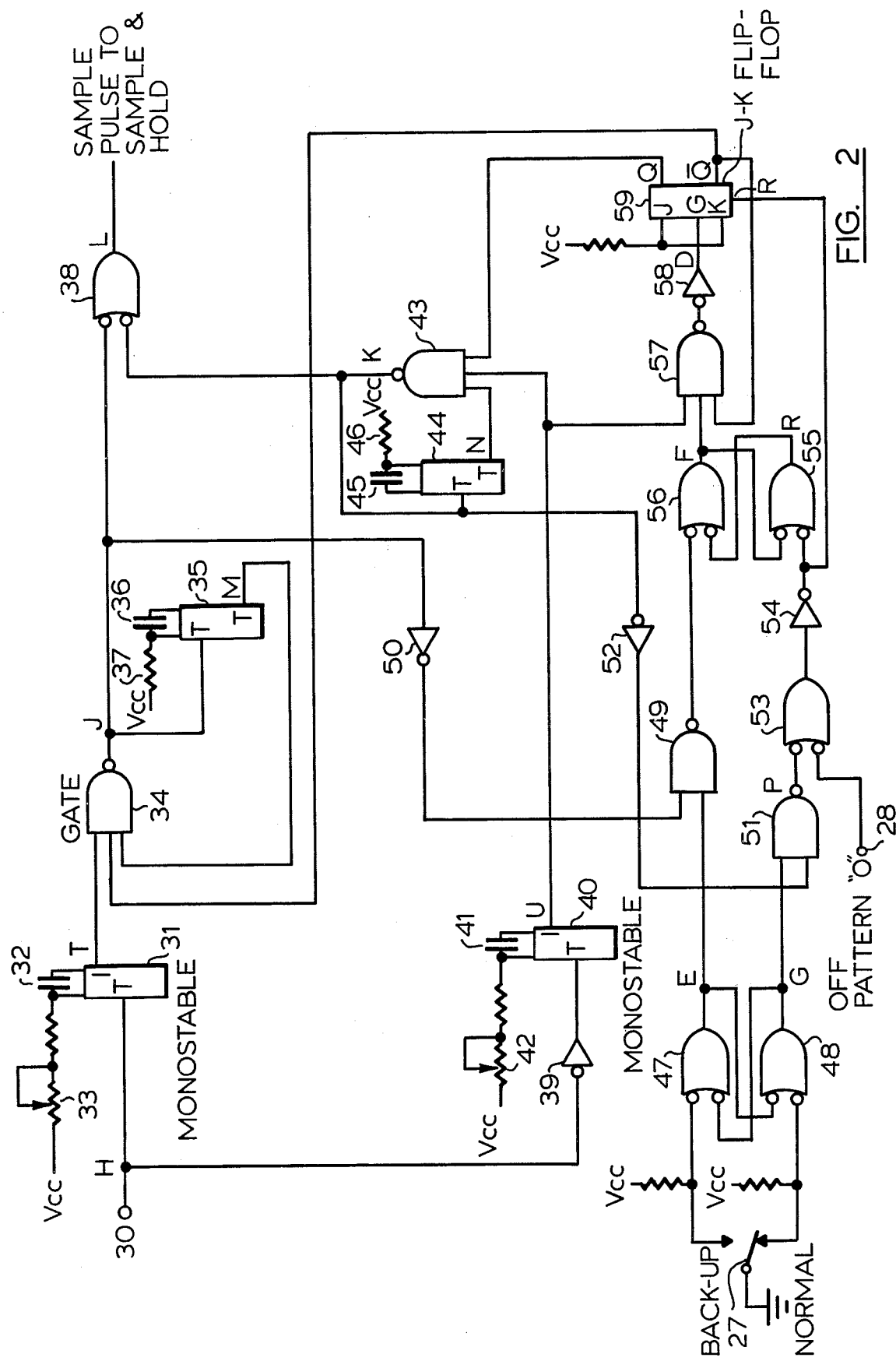
FIG. 2 is a logic diagram of a portion of such a system.

FIG. 2 is a logic diagram of the components within the dotted line 29 including the sample pulse multivibrator, the inhibit pulse multivibrator, the back-up switch 27 and terminal 28.

The output from comparator 14 is applied to terminal 30 and thence to monostable 31. Associated with the monostable 31 is a capacitor 32 and a potentiometer 33 for adjusting the pulse width of the monostable. The output from the monostable is applied to a NAND circuit 34. From the output of the NAND circuit 34 is derived a pulse which is applied to monostable 35. Associated with the monostable 35 is a capacitor 36 and a resistor 37 to establish the pulse width of the monostable as 0.8 of one rotation of the synchronous motor 1. The output from the monostable 35 is applied to the input of the NAND gate 34. Also, the output of the NAND gate 34 is applied to NOR circuit 38. The output from NOR circuit 38 is applied to the sample and hold circuits 11 and 12 in FIG. 1. The signal from comparator 14 through terminal 30 is also applied through inverting amplifier 39 to monostable 40. Associated with monostable 40 is capacitor 41 and potentiometer 42 for establishing the pulse width of the monostable. The output from this monostable is applied to NAND circuit 43. The output of NAND circuit 43 is applied to the input of monostable 44. Also associated with monostable 44 is a capacitor resistor network for establishing the pulse width of the monostable. The capacitor 45 and resistor 46 establish the period of the monostable to approximately 0.8 of one rotation of the synchronous motor 1. The output from the monostable is applied to the input of NAND circuit 43. The output from the NAND circuit 43 is also applied to the NOR circuit 38.

The switch 27 is connected to two NOR circuits 47 and 48 which are coupled in a mutually exclusive bistable arrangement. The output from NOR circuit 47 is applied to NAND circuit 49, together with a further signal from NAND gate 34 through inverter 50. Similarly, the output of NOR circuit 48 is applied to NAND circuit 51 together with a further output from the NAND circuit 43 through inverting amplifier 52. The output from NAND circuit 51 is applied to NOR circuit 53. A further input is applied to NOR circuit 53 from terminal 28. The output from NOR circuit 53 is inverted by inverter 54 and applied to NOR circuit 55. The output from NAND circuit 49 is applied to NOR circuit 56.

The two NOR circuits 55 and 56 are interconnected in a mutually exclusive manner and the output from NOR circuit 56 is applied to NAND circuit 57. A further input to NAND circuit 57 is derived from monostable 40. The output of NAND circuit 57 is applied to inverting amplifier 58. The output from inverting amplifier 58 is applied to the clock input of J-K flip-flop 59. The reset input of J-K flip-flop 59 is connected to the output of inverting amplifier 54. The Q output of flip-flop 59 is applied to NAND circuit 43 and the $\bar{Q}$ output is applied to NAND circuit 34 and also to NAND circuit 57.

OPERATION

Figure 3:
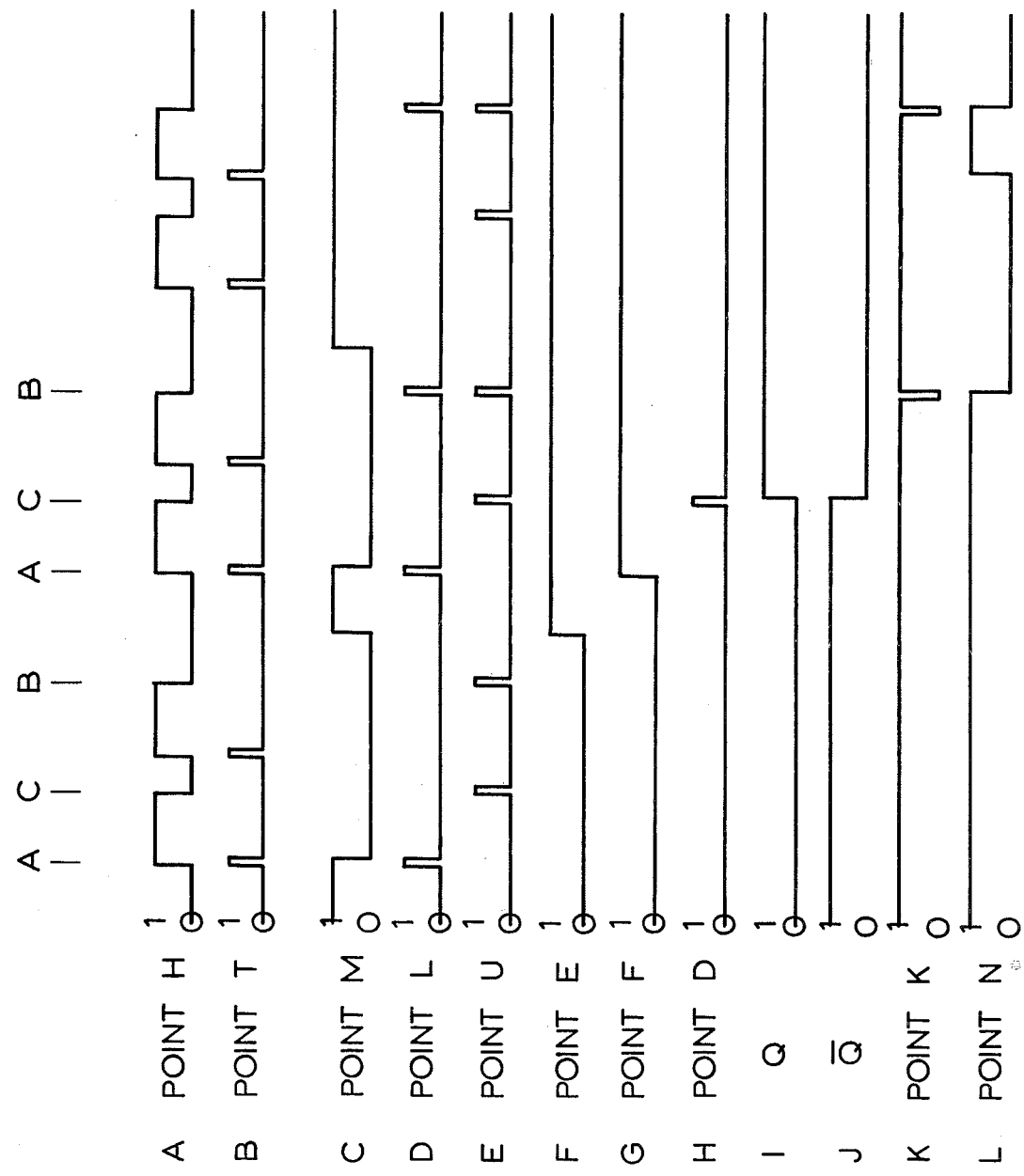
FIG. 3 is a series of waveform diagrams useful in describing the operation of the system.

Assuming first that the pattern to be traced is a line having real width and that the line is non-reflective in comparison to the paper on which it is traced, the signal at terminal 30 in FIG. 2 will be as shown at A in FIG. 3. The transition from the paper to the dark line causes an increase in output. This increase continues until the line is crossed completely causing a decrease in output. On the reverse portion of the scan the line is once more encountered causing an increase in output which continues until the scan leaves the line whereupon the output once more decreases. Monostable 31 is adjusted to produce a pulse as shown at B on every positive going excursion of the waveform shown at A. This produces a series of pulses as shown at B having a width determined by the CR constant of the monostable. It will be seen that the first pulse represents the forward intersection of the pattern by the scan, while the second pulse represents the reverse intersection. If the inputs to NAND 34 from monostable 35 and from $\bar{Q}$ of flip-flop 59 are both ones, then the output will be the same as the signal at point T which will cause the monostable 35 to produce an output as shown at C in FIG. 3. This output, which appears at M, is applied to NAND gate 34 and inhibits the second or reverse pulse. The output from NAND gate 34 when applied to NOR gate 38 appears at L as shown at D in FIG. 3. It will be seen that as a result of inhibiting the reverse pulse, the forward going pulses have been selected. These pulses may now be used in a normal manner as described in association with FIG. 1 to control the sample and hold circuits.

If switch 27 is in the normal position, the two inputs to NOR circuit 48 are zero and the output is a one. The two inputs to NOR circuit 47 are therefore ones and the output must be zero. The input to NAND 49 is therefore zero and the output is one irrespective of the signal received through inverter 50. With this one input into NOR circuit 56, the output from NOR circuit 56 is a zero causing the output from NOR circuit 55 to be a one. The output from NAND circuit 57 must be a one, because one of its inputs is zero. This is inverted by inverter 58 and applied to J-K flip-flop 59 as a zero. The output of NOR circuit 48 is one which when applied to NAND 51 produces a zero output if the input from inverter 52 is a one. If the input from terminal 28 if also a zero, the output from NOR 53 is a one. This one is inverted to a zero by inverter 54 and applied to terminal R the reset terminal of J-K flip-flop 59 causing $\bar{Q}$ to have a one output which is applied to NAND 34 as required.

When it is desired to reverse, switch 27 is placed in the back-up position, the input to NOR circuit 48 becomes a one, the output becomes a zero. The zero when applied to NAND circuit 51 becomes a one. A one applied to NOR circuit 53 produces an output which is inverted and applied to NOR circuit 55 as a one. The inputs to NOR 47 are both zero, therefore the output is a one. With this one applied to NAND 49, the output of NAND 49 becomes zero on the next one applied from inverter 50, i.e. on the next forward pulse. This zero applied to NOR 56 results in a one output when its other input is zero. But the input to NOR 55 from inverter 54 is one, therefore its output is zero as required. $\overline{Q}$ is still one and the output of monostable 40 is a one for each pulse, therefore the output of NAND 57 goes to zero on the next pulse. The zero from NAND 57 is inverted by inverter 58 and applied to the clock input of J-K flip-flop 59 causing Q to go to one and $\overline{Q}$ to go to zero on the trailing edge of the pulse received from the inverter. The zero from $\overline{Q}$ when applied to NAND 57 prevents further clocking flip-flop 59. A one on the Q output is applied to NAND circuit 43. The output of inverter 58 is shown at H of FIG. 3.

The operation of monostable 40, NAND 43 and monostable 44 corresponds to the operation of monostable 31, NAND 34 and monostable 35 except it will be noted the input to monostable 40 is inverted. Therefore, monostable 40 operates on the back edge of the pulse that is on the plus to zero portion producing the pulses shown at E in FIG. 3. Since the input to NAND 34 from the J-K flip-flop has gone to zero, the pulses as T can no longer appear at L. Instead, NAND gate 43 becomes effective and the pulses at U appear at the output of NAND gate 43 and appear at the output L.

It will be seen therefore, that the output pulses from the circuit now represent the reverse edge and as before the pulse 180° out of phase with the pulse being used for tracing is eliminated by virtue of the blanking pulse produced by monostable 44 which is of the form shown at L in FIG. 3.

Waveform at I in FIG. 3 represents the Q output of J-K flip-flop 59. Waveform J represents a $\overline{Q}$ output of the J-K flip-flop. Waveform F and G represent the outputs of NOR circuits 47 and 56 respectively.

The input to terminal 28 is the off pattern signal which is normally zero and ensures that if the equipment goes off pattern and shuts down, it restarts in the normal forward direction until the normal sequence of events determines whether the switch 27 is in the forward or backup position.

As will be seen, when the switch is moved to the backup position, even though point E changes to a one, point F does not change to a one until the next pulse is received through the inverter 50, when two ones are applied to the NAND circuit 49 and its output is zero causing the output F to be one.

In cases where the machine is tracing a silhouette, the signal at terminal 30 will have only two transitions per rotation producing a one as the scan proceeds one way across the silhouette and going to zero when it proceeds the other way across the silhouette. Under these circumstances, the J-K flip-flop will be reset until the scan completes one complete rotation, because as previously indicated, the signals applied to monostable 40 are inverted and no signal is applied to NAND circuit 57 until a plus to minus going signal is applied to the monostable. Thus, while the operation on a silhouette is somewhat different from the operation in regard to a single line drawing, nevertheless in both cases, the tracer picks up and is steered by the same edge of the pattern, whether it be the edge of the line or the edge of the silhouette, thus ensuring that no deviation occurs when reversing, due to the width of any line being traced.

While the invention has been described in association with a mechanical circular scanner, it will be understood that it has equal utility in association with other circular scan techniques. For example, circular scanning can be accomplished by sequentially interrogating a circular array of photo-sensors onto which is projected an image of a portion of the pattern. Such alternate forms of scanning require alternate methods of producing the directional sinusoid information, but the processing of the information may still be accomplished in the manner described in association with FIG. 1.

The embodiments of the invention in which an exclusive property or privilege is claimed are defined as follows:

1. In a pattern tracing system, a circular scanning electro-optical scanner having a center of optical scan, means to produce from said scanner a first pulse indicative of the relative position of said pattern in advance of said center, means to produce a second pulse indicative of the relative position of said pattern behind said center, a first gate and a second gate, means to apply said pulses to said gates, means associated with each of said gates and responsive to the transmission of a pulse through a gate, to inhibit the transmission of the immediately succeeding pulse received by such gate, a bistable device, means to cause said gates to be alternatively exclusively transmissive in accordance with the condition of said bistable device, selection means, coupling means, coupling said selection means to said bistable device, whereby said selection means determines the condition of said bistable device, but a change of condition of said selection means causes a change of condition of said bistable device only upon the structure of one of said pulses.

2. A pattern tracing system as claimed in claim 1, wherein said first gate transmits only said first pulse when said first gate is in a transmissive state and said second gate transmits only said second pulse when said second gate is in a transmissive state.

3. A pattern tracing system as claimed in claim 1 wherein said coupling means is effective to cause said bistable device always to assume the same initial condition upon system start-up or restart and thereafter assume the condition determined by the selection device.

4. A pattern tracing system as claimed in claim 2 wherein said coupling means is effective to cause said bistable device always to assume the same initial condition upon system start-up or restart and thereafter assume the condition determined by the selection device.

* * * * *

UNITED STATES PATENT AND TRADEMARK OFFICE
CERTIFICATE OF CORRECTION

PATENT NO. : 4,160,158
DATED : July 3, 1979
INVENTOR(S) : Enn Vali

It is certified that error appears in the above-identified patent and that said Letters Patent are hereby corrected as shown below:

Column 6, line 42, "structure" should read -- occurrence --.

Signed and Sealed this

Ninth Day of October 1979

[SEAL]

Attest:

RUTH C. MASON
Attesting Officer

LUTRELLE F. PARKER
Acting Commissioner of Patents and Trademarks